Patented Nov. 2, 1943

2,333,468

UNITED STATES PATENT OFFICE 2,333,468

VULCANIZING RUBBER AND PRODUCT OBTAINED THEREBY

Robert H. Cooper, Nitro, W. Va., assignor to Monsanto Chemical Company, St. Louis, Mo., a corporation of Delaware No Drawing. Application November 6, 1940, Serial No. 364,599

14 Claims. (Cl. 260—793)

The present invention relates to a new and improved class of rubber vulcanization accelerators, to a process of vulcanizing rubber or a rubber containing material and to the vulcanized rubber products obtained with the aid of said new and improved accelerators.

The accelerators of the present invention are the products obtainable by the oxidative condensation of dithiocarbamic acids and primary or secondary amines. More particularly the preferred class of accelerators comprise compounds believed to possess the structure

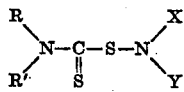

where R and R' represents univalent organic groups and may together form a single divalent organic group. For example R and R' may be the same or different alkyl, aryl, aralkyl or alicyclic groups or are united to form a closed structure. X represents hydrogen or a univalent organic group and further may be combined with Y to form a single organic divalent group, Y otherwise representing a univalent organic group.

In the preferred aspects of the invention X is a member of a group consisting of hydrogen, alkyl and aralkyl radicals and Y is selected from a group consisting of alkyl, aralkyl and alicyclic radicals or X and Y together form a single divalent organic radical.

Still more particularly it has been found that the products derived from primary amines with one notable exception hereinafter pointed out, that is to say compounds in which X is hydrogen, possess accelerating properties superior in many ways to the products derived from secondary amines.

In addition the preferred class of compounds are more active at lower temperatures but at the same time have less tendency to prevulcanize than the corresponding amine salts of the corresponding dithiocarbamic acids.

The new and preferred class of materials may be obtained by a careful oxidation of an aqueous admixture of a dithiocarbamic acid, usually in the form of a water soluble salt, and a primary or secondary amine. However, other methods of preparation may be employed where convenient or desirable. For example some secondary amines form stable N halogen derivatives which may be reacted with dithiocarbamic acid salts to form the preferred class of materials.

It is desired to point out that this invention is not limited to a few dithiocarbamic acids but that useful compounds may be obtained from any dithiocarbamic acid derived from a secondary amine. Typical secondary amines include morpholine, piperidine, dimethyl amine, hexamethylene imine, dibenzyl amine, methyl cyclohexylamine, dibutyl amine, diamyl amine, dipropyl amine, diethyl amine, diphenyl amine and equivalents and analogues thereof.

While it is not meant to imply that no other amines give oxidative condensation products it has been found that primary and secondary amines stronger than ammonia give excellent results when reacted with dithiocarbamic acids in the presence of an oxidizing agent. However it is again desired to emphasize that other methods of preparation may be utilized where desired since the present invention is not limited to the method by which the new class of accelerators are obtained. Suitable amines comprise piperidine, morpholine, dimethyl amine, diethyl amine, dipropyl amine, di n-butyl amine, di isobutyl amine, di isoamyl amine, diphenyl guanidine, dibenzyl amine, cyclohexylamine, benzyl amine, ethylene diamine, n-butyl amine, n-amyl amine, ethyl amine, p-ethyl cyclohexylamine, allyl amine, hexahydrobenzyl amine and iso butyl amine.

The following specific examples will illustrate the preparation of the new accelerators and are to be understood as illustrative of the invention but not limitative thereof.

Example I

Into a suitable vessel there was charged 183.2 parts by weight of an aqueous solution containing substantially 0.3 molecular proportions of sodium dimethyl dithiocarbamate, and 33 parts by weight (substantially 0.33 molecular proportions) of cyclohexylamine. To this mixture maintained at 45–50° C. there was added over a period of about 90 minutes substantially 330 parts by weight of a 10.16% aqueous sodium hypochlorite solution. During the addition of the latter sufficient 40% sulfuric acid was added to keep the potential below 700 millivolts as determined by an antimony electrode in conjunction with a standard saturated calomel half cell, measurement being made with a suitable potentiometer. This corresponds to a pH less than about 12.3. After completion of the reaction the product was extracted from the aqueous vehicle by a suitable organic solvent as for example ether, the solvent extracts washed and the solvent removed by any convenient method. There was finally obtained a pasty solid believed to be dimethyl thiocarbamyl cyclohexylamino sulfide of the formula

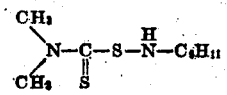

Analysis for sulfur and nitrogen gave the following results:

|  | Calculated for $C_9H_{18}S_2N_2$ | Found |
|---|---|---|
| Nitrogen | 12.8 | 12.6 |
| Sulfur | 29.3 | 27.0 |

Example II

Into a suitable reaction vessel there was charged 266.5 parts by weight of an aqueous solution containing substantially 0.25 molecular proportions of sodium cyclopentamethylene dithiocarbamate and 27.5 parts by weight (substantially 0.27 molecular proportions) of cyclohexylamine. To this mixture maintained at 46–51° C. there was added over a period of about two hours substantially 280 parts by weight of 10% aqueous sodium hypochlorite solution. During the addition of the latter sufficient 40% sulfuric acid was added to keep the potential at about 660–765 millivolts, measurement being carried out as in the foregoing example. After the addition of the hypochlorite stirring was continued for about thirty minutes at 50° C. after which the putty like mass which had separated was removed and washed until neutral. The product may be further purified by dissolving in ether, filtering off insoluble impurities and removing the solvent. A good yield of a waxy solid believed to be cyclopentamethylene thiocarbamyl cyclohexylamino sulfide was obtained. The percent sulfur found by analysis was 24.1% as compared to 24.8% calculated for $C_{12}H_{22}S_2N_2$.

Example III

Into a suitable reaction vessel there was charged 266 parts by weight of an aqueous solution containing substantially 0.25 molecular proportions of sodium cyclopentamethylene dithiocarbamate and 24.6 parts by weight (substantially 0.27 part by weight) of 95% piperidine. To this mixture maintained at about 45°–50° C. there was added over a period of about 135 minutes 280 parts by weight of 10% aqueous sodium hypochlorite solution. During the addition of the latter sufficient 40% sulfuric acid was added to keep the potential at about 700–805 millivolts, measurement being made as in the foregoing examples. After the addition of the oxidizing agent stirring was continued for about thirty minutes at 50° C. after which the charge was cooled and the insoluble product filtered off and washed until neutral. When dry the waxy solid was completely soluble in ether and where a product of higher purity is desired may be recrystallized from ether or other suitable solvent. The product appeared to be the expected cyclopentamethylene thiocarbamyl piperidyl sulfide as indicated by sulfur and nitrogen figures given below:

|  | Calculated for $C_{11}H_{20}S_2N_2$ | Found |
|---|---|---|
| Nitrogen | 11.5 | 11.6 |
| Sulfur | 26.2 | 26.0 |

Other typical examples of the invention comprise methyl cyclohexyl thiocarbamyl cyclohexylamino sulfide and dibenzyl thiocarbamyl cyclohexylamino sulfide which were prepared by the method set forth in the foregoing examples and their composition verified by analysis for sulfur and nitrogen.

As specific embodiments of the invention showing the valuable properties of the new and preferred class of accelerators but without limiting the invention, a rubber stock was compounded comprising

| Stock A, | parts by weight |
|---|---|
| Pale crepe rubber | 100 |
| Zinc oxide | 10 |
| Sulfur | 3 |
| Stearic acid | 0.5 |
| Dimethyl thiocarbamyl cyclohexylamino sulfide | 0.5 |

The stock so compounded was cured by heating in a press at the temperature of 20 pounds of steam pressure per square inch and found to possess the physical properties set forth below.

| Cure, time in mins. | Modulus of elasticity in lbs./in.² at elongations of— | | Tensile at break in lbs./in.² | Ultimate elongation, per cent |
|---|---|---|---|---|
|  | 500% | 700% |  |  |
| 15 | 325 | 1,140 | 2,930 | 870 |
| 20 | 520 | 2,090 | 3,650 | 800 |
| 30 | 715 | 3,100 | 4,415 | 765 |
| 45 | 980 | 3,950 | 4,920 | 750 |

The above data show the desirable accelerating properties of the preferred class of materials and show more particularly that dimethyl thiocarbamyl cyclohexylamino sulfide is a powerful accelerator.

As further specific embodiments of the invention but again without limiting the invention, rubber stocks were compounded comprising

| | Stock | | | |
|---|---|---|---|---|
| | B | C | D | E |
| | Parts by weight | Parts by weight | Parts by weight | Parts by weight |
| Pale crepe rubber | 100 | 100 | 100 | 100 |
| Zinc oxide | 5 | 5 | 5 | 5 |
| Sulfur | 3 | 3 | 3 | 3 |
| Cyclo pentamethylene thiocarbamyl cyclohexylamino sulfide | 0.5 | | | |
| Cyclo pentamethylene thiocarbamyl piperdyl sulfide | | 0.5 | | |
| Methyl cyclohexyl thiocarbamyl cyclohexylamino sulfide | | | 0.5 | |
| Dibenzyl thiocarbamyl cyclohexylamino sulfide | | | | 0.5 |

The stocks so compounded were found to give good cures either in 60 minutes at the temperature of five pounds steam pressure per square inch or in fifteen minutes at the temperature of twenty pounds of steam pressure per square inch, the cured rubber products exhibiting modulus and tensile properties as follows:

| Stock | Cure time in mins. | Modulus of elasticity in lbs./in.² at elongations of— | | Tensile at break in lbs./in.² | Ultimate elongation, percent |
|---|---|---|---|---|---|
|  |  | 500% | 700% |  |  |
| B | 60/5 | 495 | 2,830 | 3,700 | 785 |
| C | 60/5 | 610 | 3,080 | 4,355 | 760 |
| D | 60/5 | 300 | 1,850 | 3,170 | 845 |
| E | 60/5 | 465 | 2,210 | 3,750 | 790 |
| B | 15/20 | 340 | 1,470 | 3,310 | 835 |
| C | 15/20 | 470 | 2,250 | 4,350 | 815 |
| D | 15/20 | 240 | 955 | 2,670 | 875 |
| E | 15/20 | 320 | 1,360 | 3,100 | 835 |

The above data show the desirable accelerating properties of the preferred class of accelerators. It will be further noted that cyclopentamethylene thiocarbamyl piperidyl sulfide possesses unusually strong accelerating properties.

Further examples of the new class of compounds comprise

F. Diamyl thiocarbamyl cyclohexylamino sulfide.
G. Diamyl thiocarbamyl benzyl amino sulfide.
H. Dimethyl thiocarbamyl di-n-butyl amino sulfide.
J. Methyl cyclohexyl thiocarbamyl di-n-butyl amino sulfide.

0.5 part by weight of the above compounds were incorporated into rubber stocks comprising 100 parts by weight of pale crepe rubber, 5 parts by weight of zinc oxide and 3 parts by weight of sulfur. The rubber compositions so prepared could be cured by heating for thirty minutes at the temperature of twenty pounds steam pressure per square inch and provided vulcanized rubber products of desirable modulus and tensile properties.

The present invention is not limited to the specific examples hereinbefore set forth wherein the preferred accelerators are employed. Other ratios of the compounding ingredients than those mentioned in the examples as well as other well known fillers, pigments and the like may be employed in the production of various types of rubber compounds and are apparent to those skilled in the art to which the present invention pertains. The present invention is limited solely by the claims attached hereto as part of the present specification.

What is claimed is:

1. The process of vulcanizing rubber which comprises heating rubber and sulfur in the presence of a thiocarbamyl primary amino sulfide.

2. The process of vulcanizing rubber which comprises heating rubber and sulfur in the presence of a thiocarbamyl primary amino sulfide possessing the structure R—S—R' where R is a thiocarbamyl group and R' is the residue of a primary amine stronger than ammonia.

3. The process of vulcanizing rubber which comprises heating rubber and sulfur in the presence of a compound possessing the structure

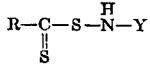

where R is a secondary amino group and the group

is the residue of a primary amine stronger than ammonia.

4. The process of vulcanizing rubber which comprises heating rubber and sulfur in the presence of a compound possessing the structure

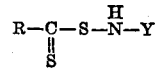

where R is a secondary amino group and Y is a cyclohexyl group.

5. The process of vulcanizing rubber which comprises heating rubber and sulfur in the presence of dimethyl thiocarbamyl cyclohexylamino sulfide.

6. The vulcanized rubber product obtained by heating rubber and sulfur in the presence of a thiocarbamyl primary amino sulfide.

7. The vulcanized rubber product obtained by heating rubber and sulfur in the presence of a thiocarbamyl primary amino sulfide possessing the structure R—S—R' where R is a thiocarbamyl group and R' is the residue of a primary amine stronger than ammonia.

8. The vulcanized rubber product obtained by heating rubber and sulfur in the presence of a compound possessing the structure

where R is a secondary amino group and the group

is the residue of a primary amine stronger than ammonia.

9. The vulcanized rubber product obtained by heating rubber and sulfur in the presence of a compound possessing the structure

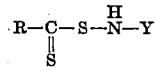

where R is a secondary amino group and Y is a cyclohexyl group.

10. The vulcanized rubber product obtained by heating rubber and sulfur in the presence of dimethyl thiocarbamyl cyclohexylamino sulfide.

11. The process of vulcanizing rubber which comprises heating rubber and sulfur in the presence of cyclopentamethylene thiocarbamyl cyclohexylamino sulfide.

12. The process of vulcanizing rubber which comprises heating rubber and sulfur in the presence of dibenzyl thiocarbamyl cyclohexylamino sulfide.

13. The vulcanized rubber product obtained by heating rubber and sulfur in the presence of cyclopentamethylene thiocarbamyl cyclohexylamino sulfide.

14. The vulcanized rubber product obtained by heating rubber and sulfur in the presence of dibenzyl thiocarbamyl cyclohexylamino sulfide.

ROBERT H. COOPER.